United States Patent Office 3,705,835
Patented Dec. 12, 1972

3,705,835
COATED FABRICS OF THERMOPLASTIC MATERIALS
Willy H. J. Badrian, Delft, Netherlands, assignor to Shell Oil Company, New York, N.Y.
No Drawing. Filed May 26, 1971, Ser. No. 147,182
Claims priority, application Great Britain, June 2, 1970, 26,529/70
Int. Cl. B32f 27/12; B65d 31/02
U.S. Cl. 161—90                                         9 Claims

ABSTRACT OF THE DISCLOSURE

This invention relates to a fabric, particularly suitable for sacks, comprising:
(a) a weave of multicomponent tapes having a low-melting thermoplastic component, such as low density polyethylene, as a surface layer of the tape at one or both faces of the weave, in addition to one or more higher-melting thermoplastic components, particularly propylene, and
(b) a coating layer comprising the low-melting component adhering to the weave at one or both faces. The invention also includes a process for the preparation of the fabric.

BACKGROUND OF THE INVENTION

Field of the invention

This invention relates to a fabric of woven and coated thermoplastic materials and a process for the manufacture of such fabric.

Prior art

Extruded thermoplastic materials are in general used in the form of film or sheet for coverings and packaging and as such are in practice impermeable to gases and liquids. For some heavy-duty application, however, such as for sacks for bulk materials, such film or sheet lacks the necessary strength.

It is known that extruded thermoplastic material can be reinforced by sandwiching a loosely woven fabric or scrim between two layers of thermoplastic material such as polyethylene. In these methods, however, the two outer layers are caused to adhere to each other either by using an adhesive or by applying one of the layers in a molten state. The result is a reinforced laminate wherein the outer layers adhere to each other but not to the fabric sandwiched between. (See for example U.S. 3,222,237 and U.S. 3,214,320.) These methods, however, are somewhat more difficult than the process described hereafter in that additional equipment is required.

It is also known that for certain heavy-duty applications thermoplastic fabric having the necessary strength may be formed by weaving strips of thermoplastic material. Particularly suitable as such strips, since they yield a thin fabric having exceptional tensile and tear strength, are flat ribbons or "tapes" made by slitting extruded thermoplastic film.

If the film, before slitting, is irreversibly stretched in the direction of the intended slitting or if after slitting the tapes themselves are stretched longitudinally then, in the case of many thermoplastics, the tapes acquire increased tensile strength and transverse tear strength owing to the tendency of the molecules to orientate parallel to the direction of stretch. Such tapes are consequently most desirable for weaving a strong fabric.

Whilst the resulting woven fabrics having the necessary strength they are, of course, permeable to gases and liquids through the interstices of the weave and this may be undesirable for example for certain bulk materials. These fabrics could be rendered relatively impermeable if it were possible to apply a thermoplastic coating layer to the fabric. This has hitherto been difficult for a number of reasons.

Thermoplastic materials differing from the material of the fabric are in most instances unsatisfactory for coating as they lack the necessary compatability to give good adhesion. If thermoplastic materials which differ from the fabric are used a "sandwich" must be prepared as discussed above. If the same thermoplastic is used for coating as it used for the woven fabric then in order to attain the necessary adhesion between fabric and coat it is generally necessary to apply a hot coat with the result that the temperature of the surface of the fabric is raised to, or near to, its melting temperature. This however, permits de-orientation of the molecules within the stretched tapes forming the fabric and in severe cases can cause deformation of the tapes themselves. This results in loss of the attractive strength properties of the fabric. Furthermore, the thermoplastics used for the fabric frequently have such high melting temperatures, e.g., polypropylene, that for practical reasons an accelerated cooling or quench after coating is essential. This, however, results in undesirable brittleness of the coat.

It has now been found that the foregoing difficulties can be overcome in a surprisingly simple way: namely, by weaving the fabric from multicomponent tapes such that one or both faces of the weave the tapes having a surface layer of a thermoplastic material having a melting temperature which is lower than that of the other component or components of the tape and then applying to such face or faces of the weave a coating of such thermoplastic material.

SUMMARY OF THE INVENTION

Accordingly, the present invention provides a fabric comprising
(a) A weave of multicomponent tapes which comprise at least two dissimilar, co-extensive layers of thermoplastic materials intimately adhering to each other, the surface layer of the tapes being a low-melting material, the other thermoplastic materials having a higher melting temperature than the first-mentioned thermoplastic material, the tapes being so positioned in the weave that the said surface layer comprising the lower melting thermoplastic material is present at substantially every point on at least one face of the weave, and
(b) A coating layer of the lowest-melting thermoplastic material adhering to at least one face of the weave having said surface layer comprising the lowest-melting thermoplastic material present at substantially every point.

The present invention also relates to a process for the manufacture of a fabric as described above, which comprises:
(a) Forming multicomponent tapes, which comprise a thermoplastic material as the surface layer on one or both sides of the tapes and one or more thermoplastic materials having a higher melting temperature than the first-mentioned thermoplastic material;
(b) So weaving the tapes that the said surface layer comprising the lowest-melting thermoplastic material is present at substantially every point on one or both faces of the weave; and
(c) Applying a coating layer comprising the said lowest-melting thermoplastic material to adhere to at least one face of the weave having the said surface layer comprising the lowest-melting thermoplastic material present at substantially every point.

PREFERRED EMBODIMENTS

The tapes will preferably have as a higher-melting component a thermoplastic material which has been stretched as mentioned above and exhibits markedly increased strength resulting from such stretching.

The tapes will also preferably have as the lowest-melting component a thermoplastic material with a low melting temperature intimately adhering to the higher melting component.

Various combinations from available thermoplastic materials such as polypropylene, high-density polyethylene, low-density polyethylene, polyamides such as nylon, polyesters such as polypivalolactone, polyacrylics, vinyl polymers and copolymers of the relevant monomers may be suitable for the present invention.

A particularly suitable combination, however, is that of polypropylene as one of the higher-melting thermoplastic materials and low-density polyethylene as the lowest-melting thermoplastic material. Although as stated other thermoplastic materials may be used in substitution for, or as an additional component in addition to, these two materials, the invention will be further described with reference to polypropylene and such polyethylene.

Fabrics made from woven stretched polypropylene tapes are known as being suitable for fabrics requiring strength owing to the marked property of increased tensile and tear strength exhibited by polypropylene tapes upon stretching. Low-density polyethylene is known as being suitable for coating applications, has a lower melting temperature than polypropylene and has the additional merit of being, relative to polypropylene, more resistant to break-down under the influence of ultra-violet light and thus forms a protective coat for the polypropylene. Hence, these two thermoplastic materials form a very suitable combination for the present invention.

The polypropylene and polyethylene can be present in any relative proportion in the tapes but since the polypropylene is present to form the basic fabric and the polyethylene is present to form a base for the subsequent polyethylene coating it will in general be preferable to use a major proportion of polypropylene and a minor proportion of polyethylene in the tapes. In this case a major proportion amounts to about 50–99 percent by weight or more while a minor amount is less than 50 percent to about 1 percent by weight.

It will be apparent that if it is desired subsequently to coat both sides of the final fabric then the tapes should have a surface layer of polyethylene on both sides.

The multi-component tapes of the present invention are most conveniently formed by forming a multicomponent sheet or film comprising at least two dissimilar co-extensive layers intimately adhering to each other, then stretching and slitting the film. Such sheet or film can be produced in any way known in the art. It may be produced (a) directly by simultaneous extrusion of the molten, or at least plastified, polypropylene and polyethylene through adjacent slit-shaped extrusion orifices or (b) by separate extrusion of the polypropylene and polyethylene into sheets or films which are subsequently laminated together, generally under pressure, or (c) one material, for example, the polypropylene, can be extruded into sheet or film and then the other material, i.e., the polyethylene, can be extruded as a coat onto the polypropylene sheet or film. The sheet or film can be extruded in the form of a tube which is later cut open in the longitudinal direction.

The sheet or film is then cut into tapes. Stretching can be carried out as stated either before or after the cutting. The stretching can be carried out in the normal way, for example at a temperature between 110° C. and 130° C. up to 6 or 7 times the original length, the upper limit of the stretch applied being determined by the lower tenacity of the polyethylene relative to the polypropylene whilst the lower the stretch ratio the lower will be the ultimate strength of the tape determined by the polypropylene component. The resultant tapes will typically have a width between 1 and 3 mm. and a thickness between 25 and 60 microns but the invention is not limited to tapes of such dimensions.

The tapes can be woven in the desired manner on normal machines. In those cases in which it is only intended to coat one face of the fabric and in which the tapes therefore require only one surface layer of polyethylene it will be apparent that the tapes must be woven so that they maintain their polyethylene surface substantially on the same face of the weave. This is no problem on modern machines in which the tapes are fed from a bobbin.

The resultant weave of tapes can then be coated with polyethylene on the face or faces of the weave with the polyethylene at the surface of the weave adhering to the polyethylene film. In order to avoid weakening or deforming the tapes forming the weave the polyethylene coat should be applied at the minimum temperature consistent with attaining good adhesion between the polyethylene applied coat and the tape surface layer of polyethylene, which is this case for polyethylene will be about 120° C.

Where it is desired to use the coated fabric for heavy-duty impermeable sacks it will often be desirable to make a fabric having only one face coated and to form the sack with the coated face on the inside of the sack which will result in the sack having a woven external surface having greater surface friction than the internal surface. Such external surface friction is desirable in heavy-duty sacks to facilitate stacking of the filled sacks.

In accordance with the invention sacks may be formed from fabric composed of tapes having 3 or more components such that the external uncoated surface of the sack is composed of material having additional desirable qualities such as improved resistance to abrasion or ultra-violet light.

Although in the foregoing, emphasis is laid on using the fabric according to the invention for sacks, this should not be construed to mean that application of such fabrics is limited thereto. Other applications, for which such fabrics have been found to be particularly suitable are carpet backing upholstery, wall covering material, tarpaulins, and other heavy-duty applications.

The present invention may be further illustrated by reference to the following examples. It is to be understood that the examples are for illustrative purposes only, and the invention is not to be regarded as limited to any one of the specific thermoplastic materials or conditions recited therein.

EXAMPLE I

Polypropylene film coated on one side with low-density polyethylene was formed by blow extrusion from a die head with two concentric annular orifices. The inner orifice was fed with polypropylene of melt index 1.5 from an extruder with the following temperature settings from hopper to die head: 180, 200, 250, 250, 220° C. The outer orifice was fed with low-density polyethylene of melt index 2 from an extruder with the following temperature settings from hopper to die head: 180, 200, 210, 210, 200° C.

The weight ratio rate of feed of polypropylene to low-density polyethylene was 9:1. The total output was at the rate of 60 kg. per hour to give film having a thickness of 80 microns at a blow-up ratio of 4:1.

The film was slit into tapes 7 mm. wide. The tapes were stretched at a ratio of 5:1 at a temperature of 125° C. yielding tapes 2.9 mm. wide and 33 microns thick. The tapes were then woven into a fabric on a conventional loom and the fabric was coated with low-density polyethylene on that face of the fabric having the polyethylene surface layer using conventional extrusion coating equipment.

EXAMPLE II

The process of Example I was repeated by utilizing high-density polyethylene of melt-index 3.5 in place of the low-density polyethylene. All other conditions were the same except that a stretch ratio of 6:1 was applied to the tapes.

I claim as my invention:

1. A fabric comprising:
   (a) a weave of multicomponent tapes which comprise at least two dissimilar, co-extensive, intimately adhering layers of thermoplastic materials of different melting points, at least one surface layer of the tapes being the lowest-melting material, the tapes being so positioned in the weave that said surface layer comprising the lowest-melting material is present at substantially every point on at least one face of the weave and
   (b) at least one coating layer comprising said lowest-melting material adhering to at least one face of the weave, having said lowest-melting material present at substantially every point.

2. A fabric as claimed in claim 1, in which the tapes comprise the thermoplastic materials stretched in the longitudinal direction of the tape.

3. A fabric as claimed in claim 1, in which the said lowest-melting thermoplastic material is present in the tapes in a minor proportion.

4. A fabric as claimed in claim 1, in which the thermoplastic materials are polypropylene and low-density polyethylene, said polyethylene being the lowest-melting material.

5. A sack comprising a fabric as claimed in claim 1, in which the fabric is coated on one side only and that coated side forms the inner surface of the sack.

6. A process for the manufacture of a fabric, which comprises:
   (a) forming multicomponent tapes, which comprise at least two dissimilar, co-extensive, intimately adhering layers of thermoplastic materials the surface layer of the tapes being the lowest-melting material, the other thermoplastic materials having a higher melting temperature than the first-mentionel thermoplastic material;
   (b) so weaving the tapes that the said surface layer comprising the lowest-melting thermoplastic material is present at substantially every point of at least one face of the weave; and
   (c) applying a coating layer comprising the lowest-melting thermoplastic material to adhere to at least one face of the weave having the surface layer comprising said lowest-melting thermoplastic material present at substantially every point.

7. The process of claim 6, wherein the tapes are formed by slitting a multicomponent sheet or film.

8. The process of claim 7, in which before slitting the sheet or film it is irreversibly stretched in the direction of the intended slitting.

9. The process of claim 8, in which after slitting the unstretched sheet or film the so obtained tapes are irreversibly stretched in a longitudinal direction before weaving.

References Cited

UNITED STATES PATENTS

| | | | |
|---|---|---|---|
| 3,072,512 | 1/1963 | Dalle | 161—92 X |
| 3,445,055 | 5/1969 | Port et al. | 161—92 X |
| 3,449,486 | 6/1969 | Contractor et al. | 264—123 X |
| 3,460,337 | 8/1969 | Feild | 161—177 X |
| 3,616,130 | 10/1971 | Rogosch | 161—92 X |
| 3,623,937 | 11/1971 | Gasaway | 161—89 |
| 3,627,620 | 12/1971 | Gasaway | 161—57 |

WILLIAM A. POWELL, Primary Examiner

U.S. Cl. X.R.

117—138; 139—389; 156—148, 229, 244, 259, 264; 161—92, 172; 229—53; 264—160, 291